(12) United States Patent
Chiang

(10) Patent No.: US 7,015,943 B2
(45) Date of Patent: Mar. 21, 2006

(54) PREMISES ENTRY SECURITY SYSTEM

(76) Inventor: Thomas S. C. Chiang, 8th Floor, No. 724, Section 3, An-Kang Road, Hsintien, Taipei (TW)

( * ) Notice: Subject to any disclaimer, the term of this patent is extended or adjusted under 35 U.S.C. 154(b) by 404 days.

(21) Appl. No.: 10/617,086

(22) Filed: Jul. 11, 2003

(65) Prior Publication Data
US 2005/0007451 A1 Jan. 13, 2005

(51) Int. Cl.
H04N 7/18 (2006.01)
(52) U.S. Cl. ........................ 348/143; 348/152; 348/155
(58) Field of Classification Search ................ 348/143, 348/152, 153, 154, 155, 161, 61; 340/506
See application file for complete search history.

(56) References Cited

U.S. PATENT DOCUMENTS

| | | | |
|---|---|---|---|
| 4,370,675 A | 1/1983 | Cohn | |
| 5,408,217 A * | 4/1995 | Sanderford, Jr. | ............ 340/506 |
| 5,907,352 A | 5/1999 | Gilley | |
| 5,995,139 A | 11/1999 | Lee | |
| 6,097,429 A | 8/2000 | Seeley et al. | |
| 6,313,872 B1 | 11/2001 | Borg | |
| 6,429,893 B1 | 8/2002 | Xin | |
| 6,476,858 B1 | 11/2002 | Ramirez Diaz et al. | |

* cited by examiner

Primary Examiner—Allen Wong
(74) Attorney, Agent, or Firm—Tipton L. Randall

(57) ABSTRACT

The invention is directed to a door bell entry security system with video camera using removable flash memory with recording/playing and answering features, plus remote computer internet access of stored data. The audio and video signals from the doorbell entry unit are also accessible in real time. The video camera can take continuous video pictures, single still frames and/or timing still frames. The combination of these features may be varied for different models. This system is for a single home unit or multiple home units in apartments, as well as all types of premises.

20 Claims, 8 Drawing Sheets

Control Unit Lines:
1. Video In.
2. Ground
3. Voice /Control
4. Output Power to Door Camera.
5. Dry Contact Point to Door Lock.
6. Dry Contact Point to Door Lock.
7. Ground
8. Sensors/Detectors (Normally Close).
9. Sensors/Detectors (Normally Close).
10. Sensors/Detctors (Mormally Open).
11. Sensors/Detectors (Normally Open).
12. Video In (Additional Video Camera, optional).

PREMISES ENTRY SECURITY SYSTEM

CROSS-REFERENCE TO RELATED APPLICATIONS, IF ANY

Not applicable

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a security system for entry to a premises and, more particularly, to a system providing both audio and video capabilities at a door to a building.

2. Background Information

The state of the art includes various devices for providing security to various portions of a premises as well as video security systems with an intercom activated by means of a doorbell. All of the disclosed systems have various shortcomings that limit the utility of the system.

For this and other reasons, a need exists for the present invention. This invention provides a doorbell answering and security system with unique features, which is believed to fulfill the need and to constitute an improvement over the background technology.

All United States patents and patent applications, and all other published documents mentioned anywhere in this application are incorporated by reference in their entirety. Some examples of security systems for which patents have been granted include the following.

Cohn, in U.S. Pat. No. 4,370,675, describes a video security system with an intercom activated by means of a doorbell. The video input to a remote camera is automatically presented on the video display of a television receiver upon activation of the doorbell, while audio from the intercom's speaker microphone is output through the television receiver's speaker system. Following a predetermined time interval after doorbell actuation, the system automatically turns off. If the television receiver is on when the doorbell is actuated, the system automatically provides video camera and intercom information at the television, reverting to the received television signal mode of operation upon user selection.

In U.S. Pat. No. 5,907,352, Gilley discloses a door mountable security system that includes a first fiber optic image conduit, a video camera having a lens visually coupled to one end of the fiber optic image conduit and a first video output. A miniature video recorder having a video input in connection with the video output of the video camera and an electrically activated record control input, is operable from a battery power source. A battery pack is in power supply connection with the miniature video recorder and has sufficient power output to power the miniature video recorder. A motion detecting device includes a pendulum switch, having an electrically conductive plumb-bob pendulum contact and an electrically conductive metal ring contact. A timer output device has a timed control output in electrical connection with the electrically activated record control input of the miniature video recorder and an electrical control input in electrical connection with the pendulum switch, such that electrical contact between the pendulum contact and the ring contact causes the timed output of the timed output device to generate a signal activating the record control input of the video recorder for a predetermined period of time.

Lee, in U.S. Pat. No. 5,995,139, describes a system for identifying visitors using a closed-circuit television camera to generate image data by reading images of visitors and a microphone to convert the sound waves received from visitors into electric waves. A door-bell button has a call-bell function available for when a visitor calls, and a switch function for operating a computer while the computer is in a hibernation state. The computer system controls and stores the signals and image data from the CCTV camera, the microphone, and the call-bell button, while a monitor displays the image data. This system identifies visitors by storing the visitor's image sensed from an identification device when the owner is absent by using a general purpose home computer. The system has a hibernation function and is inexpensive.

In U.S. Pat. No. 6,097,429, Seeley et al. disclose a site control unit located at a premises, which processes video images obtained from a plurality of cameras located about the premises and relaying the presence of a real intrusion to a central station. The site control unit has an image acquisition module receiving video images from the cameras. An image processor processes the images to eliminate possible causes of false alarms of an intrusion and reliably detects actual intrusions. The processor includes video masking to filter known motion present within a scene, detecting movement in unmasked portions of the scene, and recognition classifying the cause of the movement. An indication of an intrusion is given only if the cause is one of a class of predetermined causes, representing an intruder on the premises or an unknown cause. A video recorder records images of the actual intrusion and supplies recorded images to a security system operator who informs authorities of an intrusion. The video recorder produces snapshots of a scene viewed by the camera detecting the intrusion, authenticates the snapshots, and transmits the snapshots for viewing by the operator.

U.S. Pat. No. 6,313,872, by Borg, describes a security system for homes and small offices that provides snapshots of potential trespassers for viewing on conventional television receivers. The system consists of at least one scene capture unit, a scene recovery unit, and communication links between the scene capture units and the scene recovery unit. A scene capture unit consists of a motion detector, a conventional television camera, and circuitry which converts the camera signal into a sequence of integers that is stored in semiconductor memory and then communicated to the scene recovery unit. The scene recovery unit generates from the sequence of integers communicated by the scene capture unit a signal which, when fed into a conventional television receiver, causes the scene recorded by the camera to be displayed on one portion of the television screen and the time of occurrence to be displayed on another portion. In those situations where building access by authorized persons is significant, the scene capture unit is equipped with an event detector, which aborts the processing of snapshots taken of authorized persons either entering or leaving the building.

Xin, in U.S. Pat. No. 6,429,893, describes a security system for monitoring and recording activity within the range of a proximity detector. The security system also enables an occupant of a house, building or other structure to communicate orally with a person who approaches a door or other threshold either through means disposed at the door or other threshold, or remotely. A remote unit allows a person to monitor the activity at the door or other threshold remotely, as well as to play back recorded activity. The device includes a video camera for generating a video signal, a video monitor operably coupled to the video camera, a proximity detector for generating a first signal representative of motion proximate the video camera, and a microcontroller operably coupled to the proximity detector. The microcontroller is further operably coupled to the video camera and to the video monitor through a video recording and playback device. The microcontroller further includes firmware for activating the video camera and the video recording and playback device in response to the first signal.

In U.S. Pat. No. 6,476,858, Ramirez Diaz et al. disclose a computer-based system employing video capture, video motion detection, digital I/O and communications technology applied to monitoring and security applications. Video information, from one or more analog or digital camera, is independently converted into digital form, optionally displayed on a computer monitor in separate resizable windows, analyzed for motion and/or transmitted via the Internet or other networks. Motion detection or event triggers may be derived from a plurality of sources, including analysis of digitized camera video signals, motion detector devices, signals from alarm systems, X10 motion sensors or cameras with built-in motion detection. Once a trigger event occurs, software compresses the digitized camera image, stores it in a local database, converts it to an Internet mail binary file format, and sends the file to the address of a recipient. Alternatively, a beeper or direct phone call may be sent in response to alarm condition. A remote monitoring feature allows the system user to monitor either database or live video images from a plurality of remote locations.

SUMMARY OF THE INVENTION

The invention is directed to a security system for monitoring and controlling entry to a premises. The security system includes a doorbell unit adapted for mounting adjacent an entry door to a premises. The doorbell unit includes a doorbell call button member providing an output signal, an audio microphone member providing an output signal, an audio speaker member adapted for delivering an audio message, a video camera member providing a video output signal, and a light source adapted for illuminating a field of view of the video camera member. A control unit remote from the doorbell unit is in operative communication with the doorbell unit. The control unit includes a switch means responsive to the doorbell call button member output signal to activate the control unit, a video display monitor for displaying the doorbell unit video output signal, and a digital clock displaying the time of the video display from the doorbell video camera member. Also included is a microphone for sending an audio message to the doorbell unit speaker member, a digital data storage member adapted for storing the doorbell unit video output signal and all audio messages between the doorbell unit and the control unit, and storing events data and time of events from various sensors and detectors. The data storage member is adapted for selectively sending a prerecorded audio message to the doorbell unit speaker member. The control unit has a speaker for broadcasting an audio output from the doorbell unit microphone member, circuitry for accessing stored digital video output signals from the video camera member and stored audio messages between the doorbell unit and the control unit. In addition, an internet port circuit for accessing video and audio data in real time, and data in the digital data storage member, and a power input line for supplying power to the control unit are present. A door lock control unit is in operative communication with the control unit, with the door lock control unit having a power input line separate from the control unit power input line. The door lock unit is adapted for unlocking the entry door to a premises upon receiving a signal from the control unit.

DESCRIPTION OF THE EMBODIMENTS

Nomenclature
   100 Doorbell Unit
   105 Case of Doorbell Unit
   110 Call Button Member
   115 Microphone Member
   120 Speaker Member
   125 Video Camera Member
   130 Light Source Member
   132 Motion Sensor Member
   135 Electrical Conductor Connections
   140 Electrical Conductors
   160 Door Lock Control Unit
   165 Door Lock Unit Power Supply
   200 Control Unit
   205 Case of Control Unit
   215 Video Display Monitor
   220 Digital Clock Display
   225 Microphone Member
   230 Digital Data Storage Slot
   235 Digital Data Storage Member
   240 Speaker Member
   245 Hand Set for Control Unit
   250 Internet Port Connection
   255 Power Input Line
   260 Electrical Conductor Connections
   270 Control Unit Power Supply
   280 Wireless LAN Member

300 Combustion Detector Member
310 Gas Detector Member
320 Magnetic Intrusion Detector Members
330 Video Camera Detector Member Construction The premise entry security system of the present invention provides a video door phone with the added features of recording and playback of the video and/or still frame pictures, broadcasting of a pre-recorded voice message to visitors, voice recording and playback, a removable memory card and remote active access and control of the entry security system via the internet. Optionally, the entry security system further includes the capability of sensing or detecting gas leakage, fire, smoke, or intrusions, and to initiate a warning alarm for such situations.

The basic premise entry security system comprises a doorbell unit, adapted for mounting adjacent an entry door to a premises, and a control unit, remote from the doorbell unit and in operative communication there with. The scope of the entry security system invention includes a single doorbell unit in combination with a single control unit. Also included are multiple doorbell units in combination with a single control unit, as may be employed for monitoring and controlling multiple entry doors to a single premises. Likewise, the invention includes a single doorbell unit in combination with multiple control units, as may be employed for monitoring and controlling a single entry door to a multiple unit apartment premises.

Figure 1:
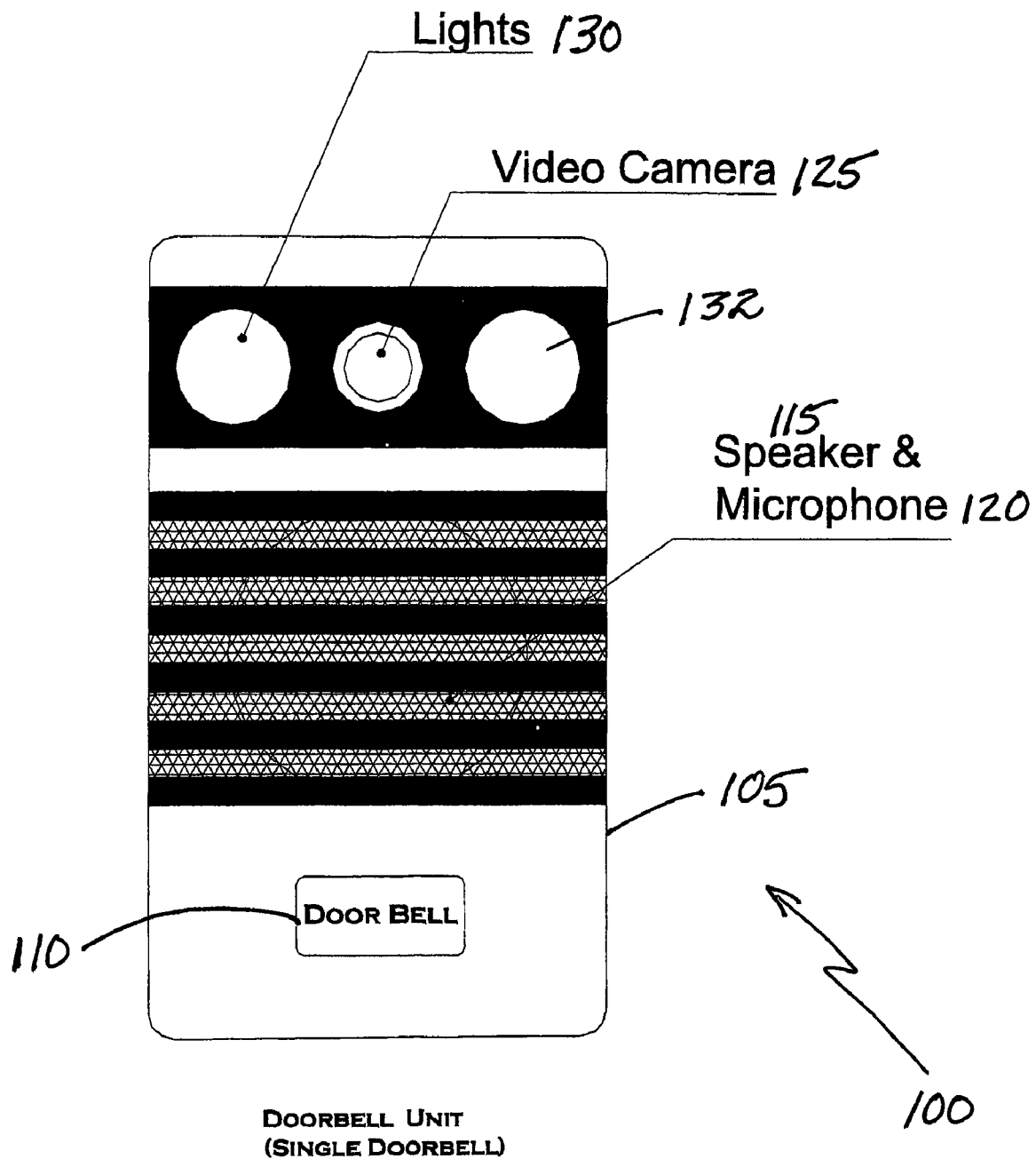
FIG. 1 is a front plan view of one embodiment of the doorbell unit of the present invention.
Figure 7:
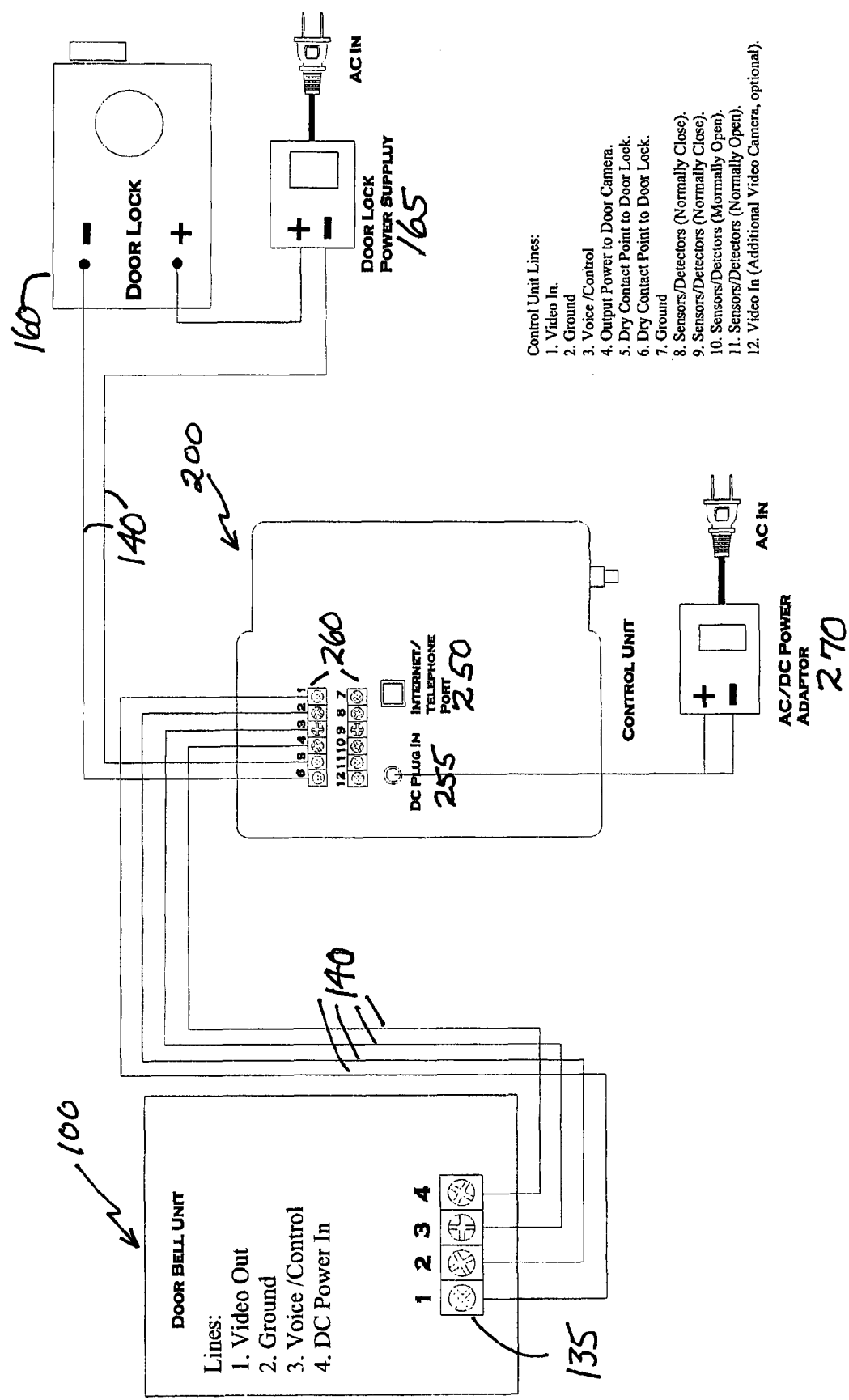
FIG. 7 is a connection circuitry diagram for the control unit, the doorbell unit and the door lock control unit of the present invention.

Referring to FIG. 1, one embodiment of the doorbell unit 100 is shown. The doorbell unit 100 includes a case 105 that supports a call button member 110, a microphone member 115 and a speaker member 120 mounted behind a protective screen in the case 105, a video camera member 125, and a light member 130 that illuminates the field of view of the video camera member 125 during the time the video camera member 125 is in operation. In a further embodiment, a motion sensor member 132 is present on the doorbell unit 100 to sense the presence of an individual at the entry door and provide an output signal at such an event. The doorbell unit 100 of FIG. 1 is in operative communication with a control unit 200 inside the premises. FIG. 7 provides a connection circuitry diagram for an entire entry control system, with the doorbell unit 100 including electrical connections 135 connected via electrical conductors 140 to the electrical conductor connections 260 of the control unit 200. The doorbell unit 100 draws power from the control unit 200 via one or more of the electrical conductors 140. The door lock control unit 160 operates on a separate power supply 165. Preferably, the system operates on low voltage direct current supplied by AC converters, which are well known in the industry.

Figure 3:
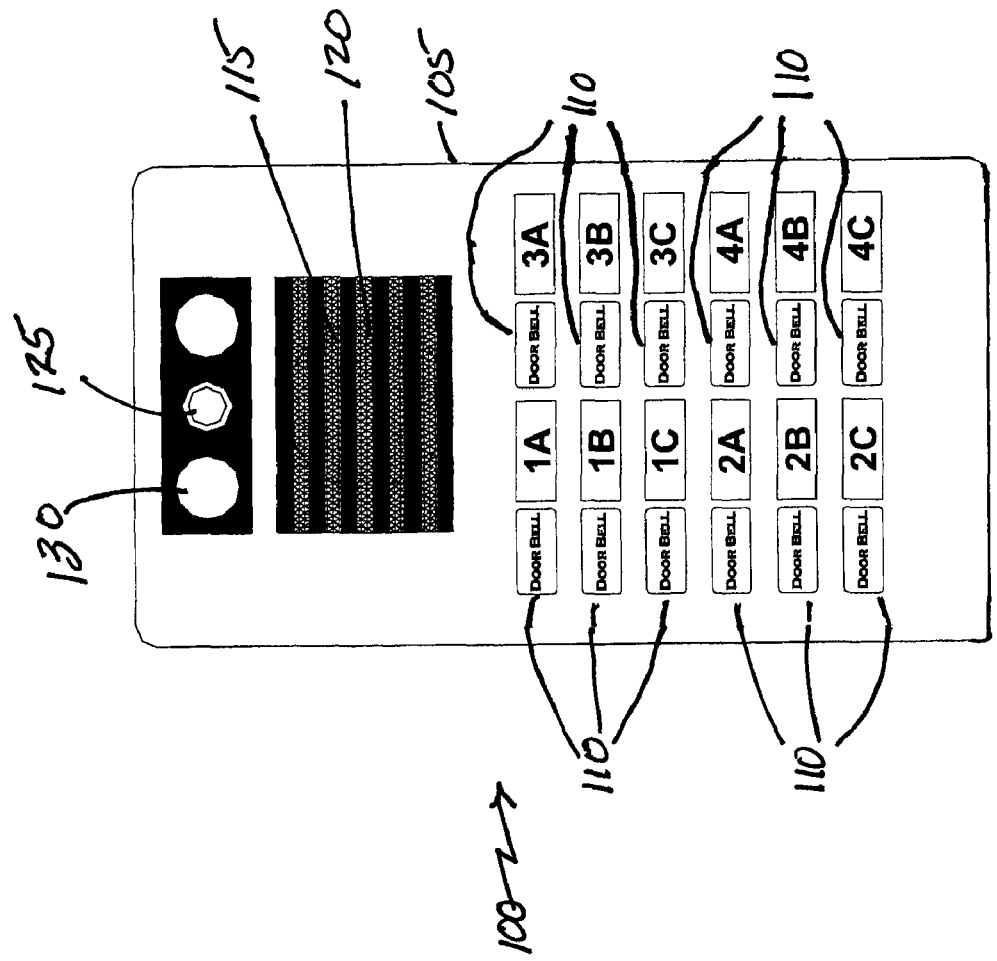
FIG. 3 is front plan view of yet another embodiment of the doorbell unit of the present invention.
Figure 2:
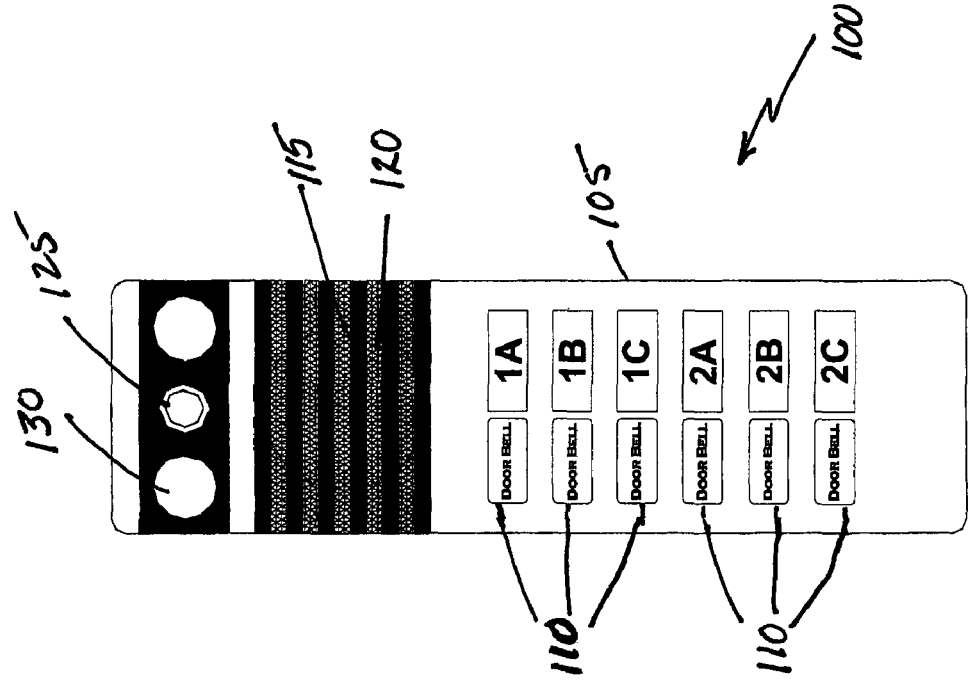
FIG. 2 is a front plan view of another embodiment of the doorbell unit of the present invention.
Figure 10:
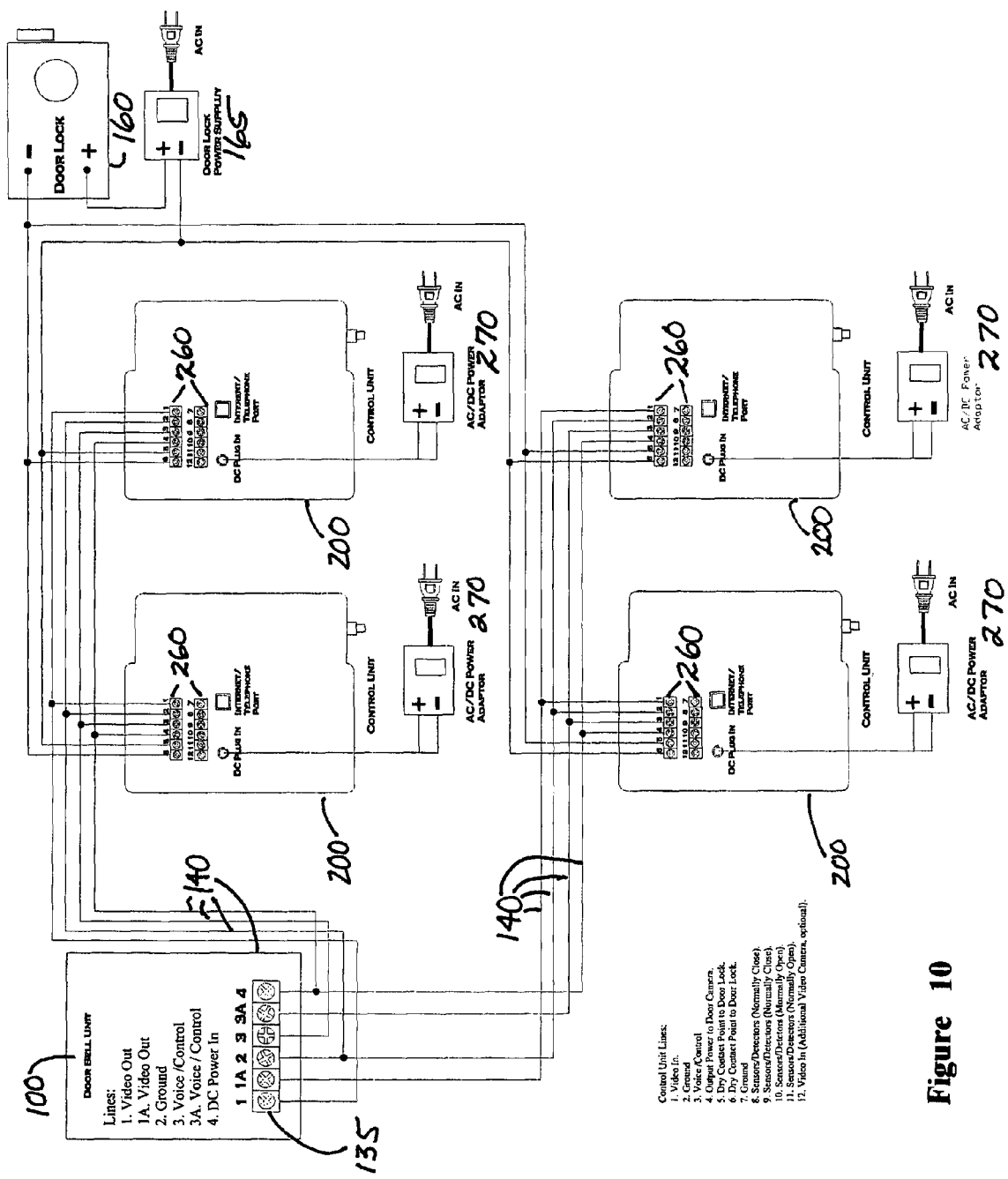
FIG. 10 is a connection circuitry diagram for multiple control units connected to one doorbell unit and one door lock control unit of the present invention.

Referring now to FIGS. 2 and 3, alternative embodiments of the doorbell unit 100 are shown. The doorbell units 100 of FIGS. 2 and 3 contain multiple call button members 110, each call button 110 connected to a separate control unit 200 within the premises. The doorbell units 100 of FIGS. 2 and 3 are suitable for use in apartment buildings where a single entry door is controlled by a control unit 200 in each apartment unit of the building. A connection circuitry diagram for multiple control units 200 connected to one doorbell unit 100 and one door lock control unit 160 is shown in FIG. 10.

Figure 4:
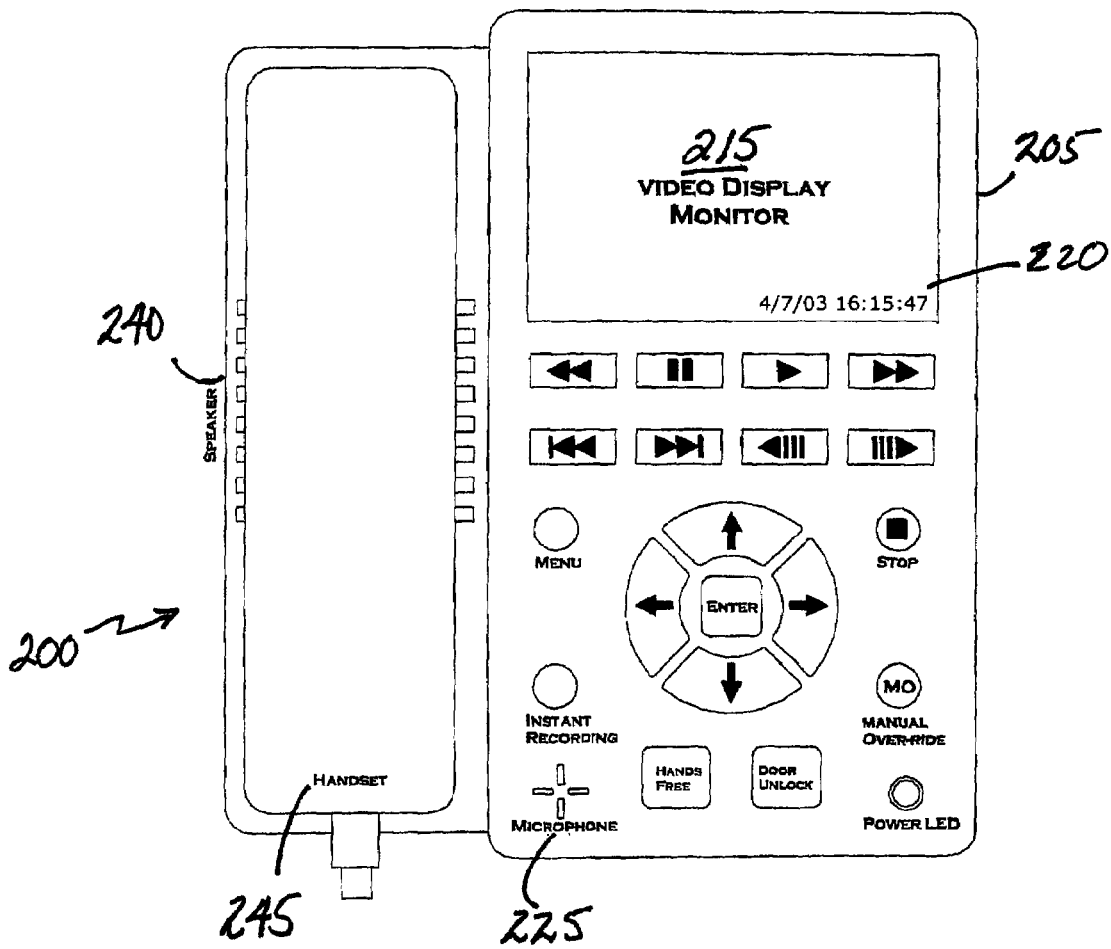
FIG. 4 is top plan view of one embodiment of the control unit of the present invention.
Figure 5:
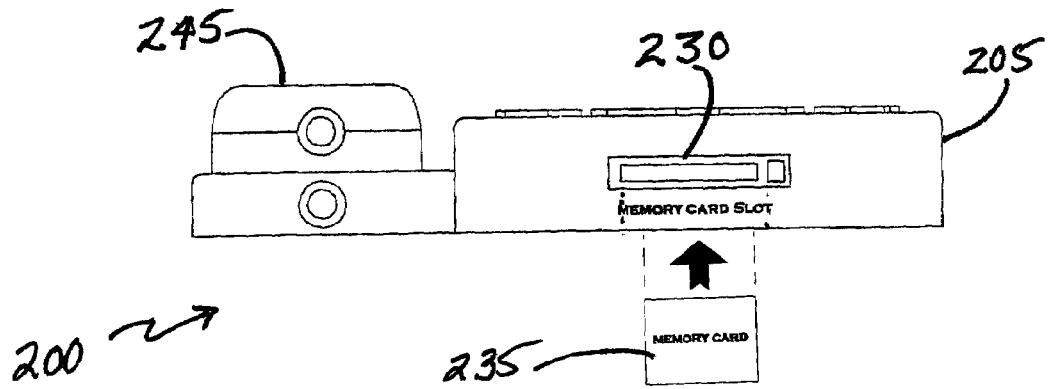
FIG. 5 is a bottom plan view of one embodiment of the control unit of the present invention.
Figure 6:
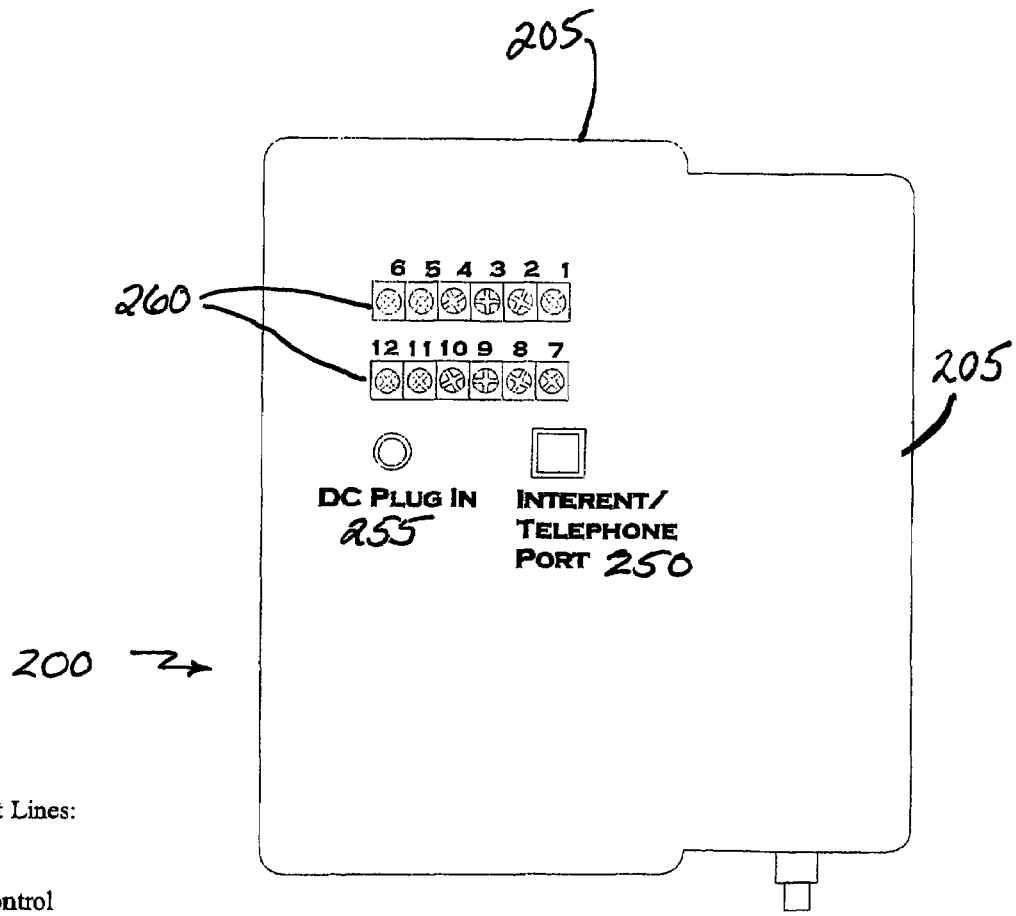
FIG. 6 is a side plan view of one embodiment of the control unit of the present invention.

One embodiment of a control unit 200 that is located remotely from the doorbell unit 100 is shown in FIGS. 4–6. The control unit 200 is in operative communication with the doorbell unit 100 to allow an individual within the premises to communicate with another individual who activates the doorbell unit 100. The control unit 200 is also in operative communication with the door lock control unit 160. The control unit 200 includes a case 205 that contains the control unit components. A video display monitor 215 displays the doorbell unit video output signal. A digital clock 220 displays the time of the video display from the doorbell video camera member 125. There is a microphone member 225 for sending an audio message to the doorbell unit speaker member 120. The control unit 200 also provides a digital data storage member 235, removably insertable into a storage slot 230, for storing the doorbell unit video output signal and all audio messages between the doorbell unit 100 and the control unit 200. The data storage member 235 is adapted for selectively sending a prerecorded audio message to the doorbell unit speaker member 120. The control unit 200 also contains a speaker member 240 for broadcasting an audio output from the doorbell unit microphone member 115. Additionally, there is provided a handset 245 containing a speaker and microphone, which can be used in addition to the microphone 225 and speaker 240 in the control unit case 205. There is circuitry present in the control unit 200 for accessing stored digital video output signals from the video camera member 125 and stored audio messages between the doorbell unit 100 and the control unit 200. In addition, the control unit 200 includes an internet port connection 250 for accessing data in the digital data storage member 235, or accessing video and audio data in a real time mode, via an electrical connector, such as a telephone line (not shown). Also present is a power input line 255 for supplying power to the control unit 200. The power source for the control unit 200 is preferably a low voltage direct current source 270 that converts alternating current (AC) to suitable direct current (DC). As seen in FIG. 5, the control unit 200 includes a number of electrical conductor connections 260 for communication with the doorbell unit 100 and the door lock control unit 160.

Figure 8:
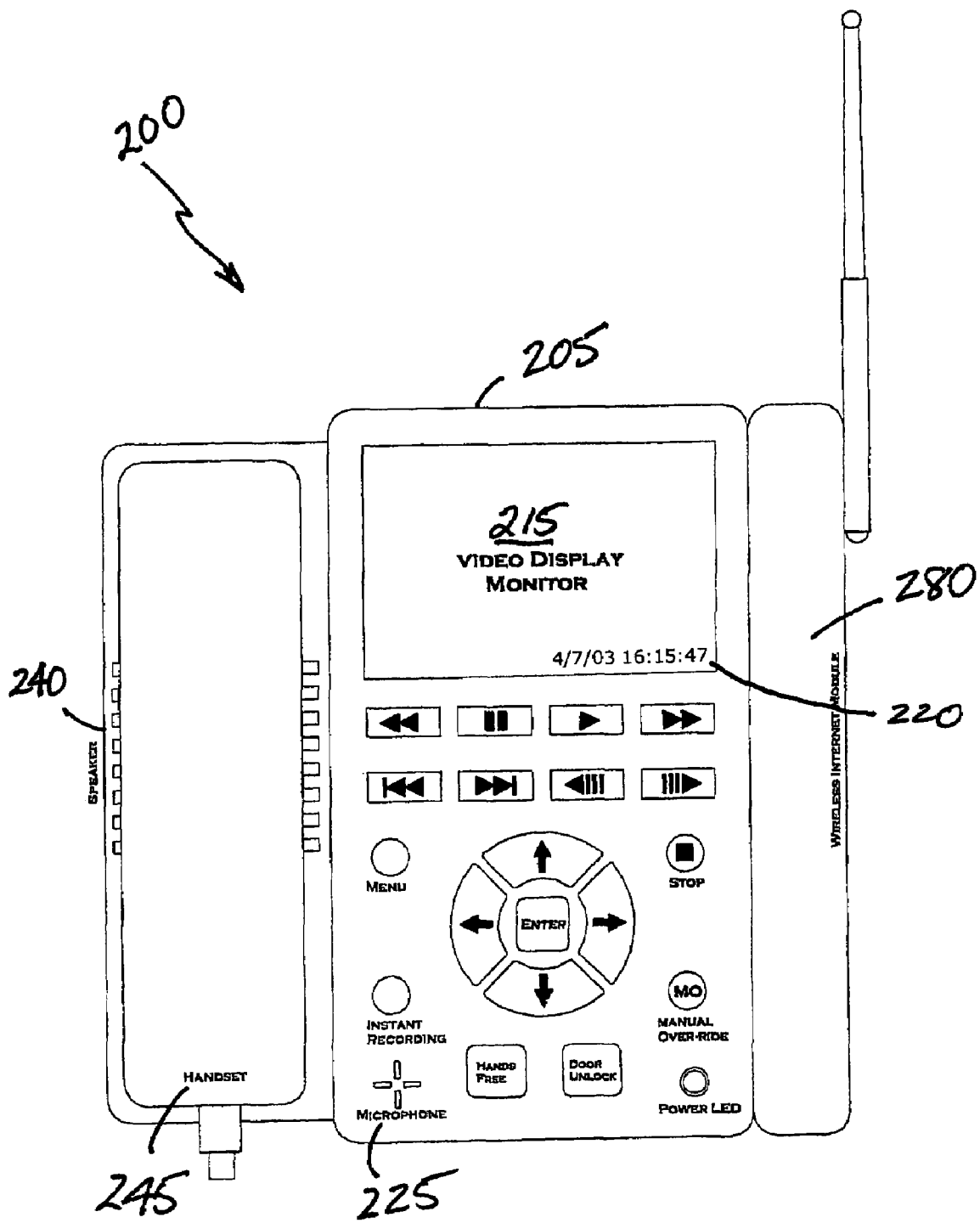
FIG. 8 is a top plan view of a further embodiment of the control unit of the present invention.

In an alternative embodiment shown in FIG. 8, the control unit includes a wireless LAN member 280 for accessing data on the digital data storage member 235 from a remote location via the internet.

Figure 9:
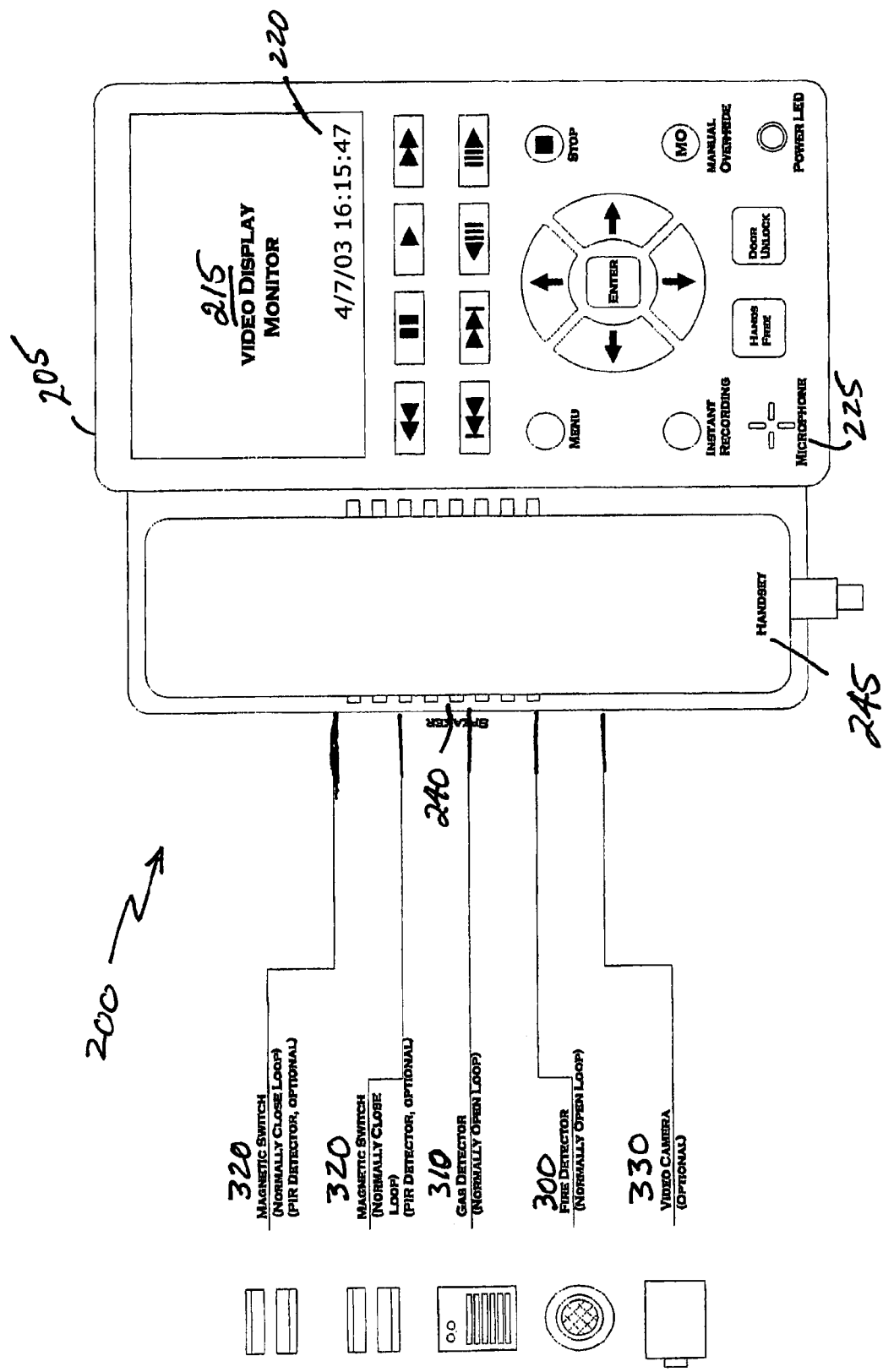
FIG. 9 is a top plan view of another further embodiment of the control unit of the present invention.

In a further embodiment of the invention, FIG. 9 discloses a control unit 200 including additional features. In this embodiment, the control unit 200 is in operational communication with additional detector members to provide enhanced security for the premises. The additional detector members may be either open loop or closed loop detectors, and include a combustion detector member 300 that detects fire and/or smoke, a gas detector member 310 that detects hydrocarbon gas leakage, and one or more magnetic switch intrusion detector members 320 to detect intruders entering the premises via a window or other entrance. The magnetic switch intrusion detector members 320 are fastened to a window or other entrance to detect the opening of that entrance. Additionally, a second video camera detector member 330 is connected to the control unit 200. Detection of an unsafe or intrusion event sends an alarm signal by the control unit 200, via the internet, to preselected addresses.

The security system's general operation is as follows. Each call button member 110 in the doorbell unit 100 is connected to one control unit 200. A press of a call button member 110, or a signal from the motion sensor 132 or the alarm detectors 300, 310, 320, 330, activates the associated control unit 200. All recording of events, including a digital time display 220, are shown on the video display monitor 215. The control unit 200 is activated by a press of the call button member 110. When a press of the call button member 110 activates the security system, there will be two actions initiated by the control unit 200.

After a preset duration of time, if the handset 245 of the control unit 200 is not lifted or the "Hands Free" button is not pressed, an occupant pre-recorded message is broadcasted via the speaker 120 in the doorbell unit 100 to the visitor. The video image display and recording and voice recording are activated automatically to record the visitor's video image, as well as visitor's answering voice message. The occupant can preset the duration of the voice and video image recording and the duration and mode of video image recording. If the recording needs to be stopped, pressing the "Stop" button on the control unit 200 terminates the recordings.

Within a preset duration of time, if the handset 245 of the control unit 200 is lifted or the "Hands Free" button is pressed, the broadcast of the pre-recorded message is disabled, and the occupant can have voice communications with the visitor. The video and voice recordings can be preset by occupant in two modes: "Never Recording" and "Always Recording". A press of the "Instant Recording" button overrides the "Never Recording" mode. If the recording needs to be stopped, pressing the "Stop" button on the control unit 200 terminates the recordings. The video and audio recording also can be terminated by hanging up the handset 245. The door can be opened by pressing the "Door Unlock" button on the control unit 200.

In the event the control unit 200 is activated by a signal from one of the hazard/intrusion sensors or detectors, there are two actions initiated by the control unit 200. The alarm in the control unit 200 is initiated. The time and location of event are recorded. An alarm message is sent out via the internet to preselected e-mail addresses. If a video camera 330 is fitted at the location of the activated sensor or detector, the video recording will be initiated.

If the control unit 200 is connected to more than one video camera member 125, the control unit 200 can be set to display and record the video image of a designated video camera 125. The mode of recording can occur in three modes: Continuous, Still frames, or Timing still frames. The control unit 200 is able to display and record split screen images from two or four relevant video cameras 125.

The control unit 200 connects to the internet either by hard wire or by a wireless LAN member 280. All events, inclusive of video and voice data, can be accessed, monitored, or controlled by changing the control unit settings by any authorized personal having the proper password, from any remote location with a computer equipped with an internet connection. The priority of recording of video signals from the video camera 330 and the video camera 125 in the doorbell unit 100 can be preset at the control unit 200. The second video camera 330 can be preset to take continuous, single still frames and/or timing still frame pictures.

The control unit 200 sends out a message of an event to preset e-mail addresses, if any event occurs. The video and voice data can be accessed and monitored in real time mode or at any time after the events occurred.

If the occupant is absent or does not want to see the visitor, the occupant can store on the memory card a pre-record voice message to visitors. For example, the message may ask visitors to leave a voice message of their name, contact details and the purpose of the visit. All video and voice data and events are stored in the digital memory card 235. The number of events and the overall duration of recording are restricted by the memory size of the memory chip in the memory card 235, the preset audio format, and video and still image resolution, size and formats, as well as the duration timing of taking the still frame images. A currently available Flash memory chip is used on the memory card 235. The memory card 235 is removable from control unit 200, and its content is readable into a general purpose computer for storage, playback, analysis and processing.

The security system components specifications include the following:
1. Video Camera: Digital or analog video camera with CCD or CMOS image sensor or all future development of video cameras that meet industrial standards.
2. Video Display: Digital flat panel type (such as currently available TFT-LCD) or flat tube CRT, color or black and white or all future development of video displays that meet industrial standards.
3. Memory Card: Use FLASH memory chip or all future development of memory device of industrial standards that can read/write and is erasable.
4. Use of DC power supply, converting from AC power, or use of batteries for the security system.
5. Internet: Current or future developed industrial standards.
6. Wireless Connections: Current or all future developed industrial standards.
7. Power supplies to the individual units in the security system are shown in the FIGS. 7 and 10.
8. The security system uses components of industrial standards of current and future developments.

The components of the system may include, but are not limit to, one of the following types or formats:
   a. Memory Card: Compact Flash Card, Memory Stick, SC (Secure Digital) Memory Card, MultiMedia Card, xD Picture Card, Smart Media Digital Film Card.
   b. Video Camera: Digital or analog video camera using either CCD or CMOS image sensor.
   c. Video Format: avi, mpeg, mpeg4, asf, wma., mov, smi, sml, flc, flu, vfw, dvt, etc.
   d. Still Image Format: JPEG, TIFF, BMP, EPS, PCX, PCT, PNG, PXR, RAW, SCT, PSD, GIF.
   e. Voice and Audio: mp3, wmw, way, aiff, au, snd, mpg, mpg4, gcp, sdz, kar, smf, midi, ulw, cdda, etc.

The descriptions above and the accompanying materials should be interpreted in the illustrative and not the limited sense. While the invention has been disclosed in connection with the preferred embodiment or embodiments thereof, it will be understood by those skilled in the art that various changes in form and details may be made therein without departing from the spirit and scope of the invention.

I claim:

1. A security system for monitoring and controlling entry to a premises comprising;
   a doorbell unit adapted for mounting adjacent an entry door to a premises, the doorbell unit including;
      (a) a doorbell call button member providing an output signal;
      (b) an audio microphone member providing an output signal;
      (c) an audio speaker member adapted for delivering an audio message;
      (d) a video camera member providing a video output signal;
      (e) a light source member adapted for illuminating a field of view of the video camera member;
   a control unit remote from the doorbell unit and in operative communication there with, the control unit including:
      (a) switch means responsive to the doorbell call button member output signal to activate the control unit;
      (b) a video display monitor for displaying the doorbell unit video output signal;

(c) a digital clock displaying the time of the video display from the doorbell video camera member;

(d) a microphone member for sending an audio message to the doorbell unit speaker member;

(e) a digital data storage member adapted for storing the doorbell unit video output signal and all audio messages between the doorbell unit and the control unit, the data storage member adapted for selectively sending a prerecorded audio message to the doorbell unit speaker member, and adapted for storing events data and time of events from a sensor and a detector;

(f) a speaker member for broadcasting an audio output from the doorbell unit microphone member;

(g) circuitry for accessing stored digital video output signals from the video camera member and stored audio messages between the doorbell unit and the control unit;

(h) an internet port circuit for accessing video and audio data in real time and for accessing data in the digital data storage member;

(i) a power input line for supplying power to the control unit, the doorbell unit receiving power from the control unit; and a door lock control unit in operative communication with the control unit, the door lock control unit having a power input line separate from the control unit power input line, the door lock unit adapted for unlocking the entry door to a premises upon receiving a signal from the control unit.

2. The security system for monitoring and controlling entry to a premises according to claim 1, further including a sensor means in the doorbell unit adapted for detecting an individual at the premises door, the sensor means activating the control unit.

3. The security system for monitoring and controlling entry to a premises according to claim 1, wherein the digital data storage member is removable from the control unit.

4. The security system for monitoring and controlling entry to a premises according to claim 1, further including a handset containing a speaker and a microphone, the handset operatively connected to the control unit.

5. The security system for monitoring and controlling entry to a premises according to claim 1, wherein the control unit internet port circuit is accessed by a hardwire telephone line.

6. The security system for monitoring and controlling entry to a premises according to claim 1, wherein the control unit internet port circuit is accessed by a wireless LAN member.

7. The security system for monitoring and controlling entry to a premises according to claim 1, wherein the control unit is in operative communication with the doorbell unit and the door lock control member by hardwire electrical conductors.

8. The security system for monitoring and controlling entry to a premises according to claim 1, wherein the control unit is in operative communication with the doorbell unit and the door lock control member by a wireless connection.

9. The security system for monitoring and controlling entry to a premises according to claim 1, further including a combustion hazard detector in operative communication with the control unit, the combustion hazard detector adapted to active the control unit upon detecting combustion.

10. The security system for monitoring and controlling entry to a premises according to claim 1, further including a gas hazard detector in operative communication with the control unit, the gas hazard detector adapted to active the control unit upon detecting gas.

11. The security system for monitoring and controlling entry to a premises according to claim 1, further including a magnetic intrusion detector in operative communication with the control unit, the magnetic switch intrusion detector adapted to active the control unit upon detecting an intruder.

12. The security system for monitoring and controlling entry to a premises according to claim 1, further including a second video camera detector in operative communication with the control unit, the second video camera detector adapted to activate upon activation of a hazard or intrusion detector.

13. A security system for monitoring and controlling entry to a premises comprising;

a doorbell unit adapted for mounting adjacent an entry door to a premises, the doorbell unit including;

(a) a doorbell call button member providing an output signal;

(b) an audio microphone member providing an output signal;

(c) an audio speaker member adapted for delivering an audio message;

(d) a video camera member providing a video output signal;

(e) a light source member adapted for illuminating a field of view of the video camera member;

a control unit remote from the doorbell unit and in operative communication there with, the control unit including:

(a) switch means responsive to the doorbell call button member output signal to activate the control unit;

(b) a video display monitor for displaying the doorbell unit video output signal;

(c) a digital clock displaying the time of the video display from the doorbell video camera member;

(d) a microphone member for sending an audio message to the doorbell unit speaker member;

(e) a digital data storage member adapted for storing the doorbell unit video output signal and all audio messages between the doorbell unit and the control unit, the data storage member adapted for selectively sending a prerecorded audio message to the doorbell unit speaker member, and storing events data and time of events from a sensor and a detector;

(f) a speaker member for broadcasting an audio output from the doorbell unit microphone member;

(g) circuitry for accessing stored digital video output signals from the video camera member and stored audio messages between the doorbell unit and the control unit;

(h) an internet port circuit for accessing video and audio data in real time and for accessing data in the digital data storage member;

(i) a power input line for supplying power to the control unit, the doorbell unit receiving power from the control unit;

(j) at least one alarm condition detector; and a door lock control unit in operative communication with the control unit, the door lock control unit having a power input line separate from the control unit power input line, the door lock unit adapted for unlocking the entry door to a premises upon receiving a signal from the control unit.

14. The security system for monitoring and controlling entry to a premises according to claim 13, further including a sensor means in the doorbell unit adapted for detecting an individual at the premises door, the sensor means activating the control unit.

15. The security system for monitoring and controlling entry to a premises according to claim 13, wherein the digital data storage member is removable from the control unit.

16. The security system for monitoring and controlling entry to a premises according to claim 13, further including a handset containing a speaker and a microphone, the handset operatively connected to the control unit.

17. The security system for monitoring and controlling entry to a premises according to claim 13, wherein the control unit internet port circuit is accessed by a hardwire telephone line.

18. The security system for monitoring and controlling entry to a premises according to claim 13, wherein the control unit internet port circuit is accessed by a wireless LAN member.

19. The security system for monitoring and controlling entry to a premises according to claim 13, wherein the at least one alarm condition detector is selected from the group a combustion detector, a hydrocarbon gas detector, and a magnetic switch intrusion detector.

20. A security system for monitoring and controlling entry to a premises comprising;
   a doorbell unit adapted for mounting adjacent an entry door to a premises, the doorbell unit including;
      (a) a doorbell call button member providing an output signal;
      (b) an audio microphone member providing an output signal;
      (c) an audio speaker member adapted for delivering an audio message;
      (d) a video camera member providing a video output signal;
      (e) a light source member adapted for illuminating a field of view of the video camera member;
   a control unit remote from the doorbell unit and in operative communication there with, the control unit including:
      (a) switch means responsive to the doorbell call button member output signal to activate the control unit;
      (b) a video display monitor for displaying the doorbell unit video output signal;
      (c) a digital clock displaying the time of the video display from the doorbell video camera member;
      (d) a microphone member for sending an audio message to the doorbell unit speaker member;
      (e) a removable digital data storage member adapted for storing the doorbell unit video output signal and all audio messages between the doorbell unit and the control unit, the data storage member adapted for selectively sending a prerecorded audio message to the doorbell unit speaker member, and storing events data and time of events from a sensor and a detector;
      (f) a speaker member for broadcasting an audio output from the doorbell unit microphone member;
      (g) circuitry for accessing stored digital video output signals from the video camera member and stored audio messages between the doorbell unit and the control unit;
      (h) an internet port circuit for accessing video and audio data in real time and for accessing data in the digital data storage member;
      (i) a power input line for supplying power to the control unit, the doorbell unit receiving power from the control unit;
      (j) at least one alarm condition detector;
      (k) a handset containing a speaker and a microphone, the handset operatively connected to the control unit; and
   a door lock control unit in operative communication with the control unit, the door lock control unit having a power input line separate from the control unit power input line, the door lock unit adapted for unlocking the entry door to a premises upon receiving a signal from the control unit.

\* \* \* \* \*